No. 757,953. PATENTED APR. 19, 1904.
C. C. NEWTON.
INSERTIBLE SAW TOOTH FOR METAL SAWS.
APPLICATION FILED JAN. 23, 1901.
NO MODEL.
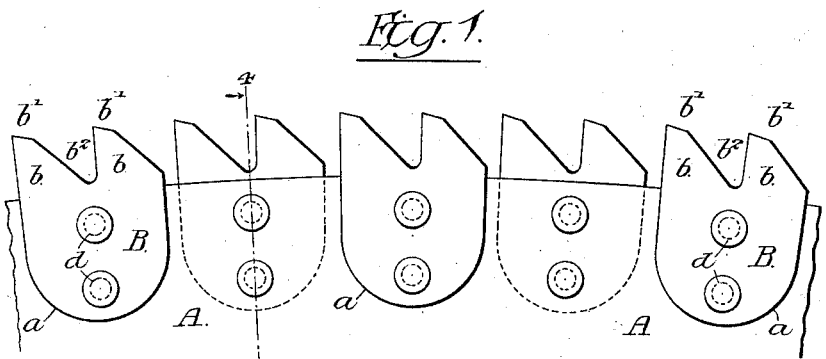
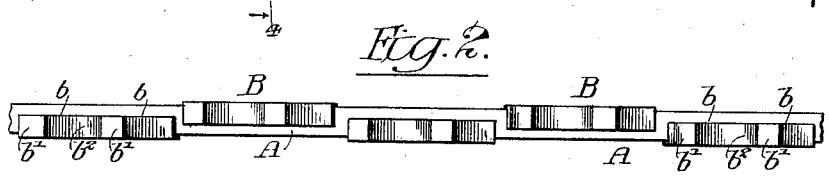
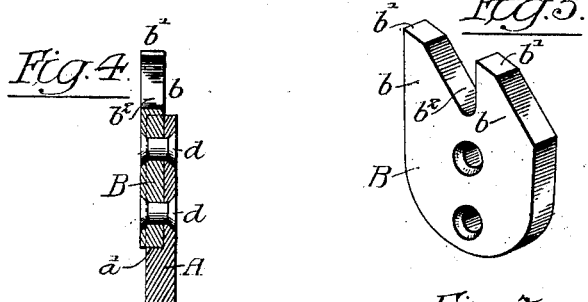
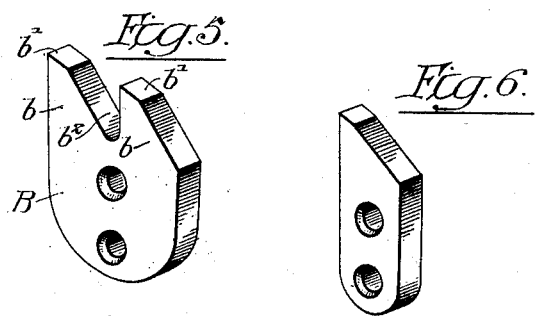
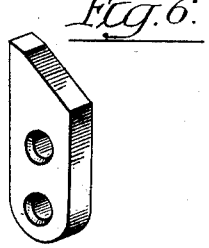
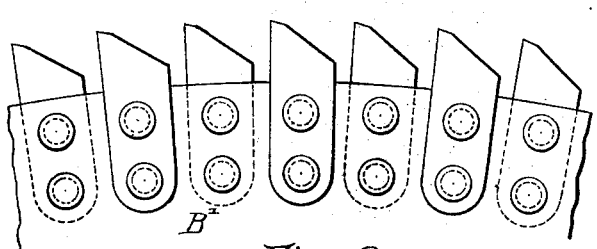
Witnesses:—
Inventor:—
Charles C. Newton,
by his Attorneys:—

No. 757,953. Patented April 19, 1904.

UNITED STATES PATENT OFFICE.

CHARLES C. NEWTON, OF PHILADELPHIA, PENNSYLVANIA, ASSIGNOR TO THE NEWTON MACHINE TOOL WORKS, INCORPORATED, OF PHILADELPHIA, PENNSYLVANIA, A CORPORATION OF PENNSYLVANIA.

INSERTIBLE SAW-TOOTH FOR METAL-SAWS.

SPECIFICATION forming part of Letters Patent No. 757,953, dated April 19, 1904.

Application filed January 23, 1901. Serial No. 44,414. (No model.)

*To all whom it may concern:*

Be it known that I, CHARLES C. NEWTON, a citizen of the United States, residing in Philadelphia, Pennsylvania, have invented certain Improvements in Insertible Saw-Teeth for Metal-Saws, of which the following is a specification.

The object of my invention is to provide a metal-saw with detachable teeth that can be readily secured in place and which will not weaken the body of the saw-blade and will be substantial and so set as to give clearance to the blade.

In the accompanying drawings, Figure 1 is a side view of sufficient of a circular-saw blade to illustrate my invention, showing the teeth attached. Fig. 2 is a plan view of Fig. 1. Fig. 3 is a view similar to Fig. 2 with the teeth removed. Fig. 4 is a section on the line 4 4, Fig. 1. Fig. 5 is a detached perspective view of the double tooth shown in Fig. 1. Fig. 6 is a perspective view of a single tooth. Fig. 7 is a side view of part of a blade, showing a series of single teeth in position; and Fig. 8 is a plan view of Fig. 7.

A is the body of the saw-blade. This blade in the present instance is circular, and I have simply shown a portion of the blade, which will illustrate my invention. The blade is recessed at $a$ $a$ on one side, and alternating with these recesses are recesses $a'$ on the opposite side. Fitting in the recesses $a$ and $a'$ are the sections B, having teeth $b$, two in the present instance, as shown in Fig. 5. The sections B are slightly thicker than the depth of the recesses, so as to extend beyond the side of the blade, and thus give clearance to the blade. The teeth extend beyond the periphery of the blade, as shown, and are beveled slightly at the cutting-point $b'$ and are beveled for clearance at $b^2$, each tooth being shaped as clearly shown in Fig. 5. I preferably make the base of the tooth rounded, and I round the bottom of the recess, so that it will conform to the tooth, and I perforate the tooth-section, as well as the blade, the perforations being in line, and I secure the section B to the blade by one or more rivets $d$, two in the present instance.

I may use other other fastening devices, such as screws, but I prefer rivets. It will be seen that I form two teeth on each section B. By this means I reduce the cost of manufacture and make a very substantial tooth-section and only need two rivets to secure each section B to the blade. The sections can be readily removed and replaced. Thus it will be seen that I am enabled to make a circular saw having insertible teeth in which the saw-blade can be made of comparatively thin metal, and by alternating the recesses for the teeth, one series being on one side of the blade and the other series on the opposite side, I do not weaken the blade to any appreciable extent and at the same time provide a solid backing for the tooth.

The tooth can be cheaply manufactured and readily applied to the blade, and when once applied is perfectly rigid, as the strain is not upon the rivet, but is taken by the shoulder back of the tooth.

In Figs. 6, 7, and 8 I have shown a section B' with a single tooth. This form may be used in some instances, and in light work one rivet may secure the tooth to the blade.

It will be understood that my invention is especially designed for saws for sawing metal. Heretofore a solid saw-blade has been preferred, owing to the character of the work and the necessary heavy cuts; but by my invention I overcome this objection to insertible-tooth saws by making the tooth in the manner set forth above.

I claim as my invention—

1. The combination of a saw-blade having a series of recesses in each side, the recesses on one side alternating with those of the other side, with tooth-sections mounted in said recesses parallel to the plane of the saw-blade and of a thickness greater than the depth of the recesses, said teeth extending beyond the periphery of the blade and having means for securing them in position, substantially as described.

2. The combination of a circular saw-blade having a series of recesses in each side, one series of recesses alternating with the other series, uniformly flat tooth-sections parallel to each other and parallel to the plane of the saw-blade mounted in the recesses and projecting beyond the periphery of the blade, each of said sections being formed to fit the recesses and being provided with means whereby it is secured to the blade, substantially as described.

3. The combination of a saw-blade having a series of relatively shallow recesses in each side of the same, one series of the recesses alternating with the other series, flat tooth-sections mounted in the recesses and extending beyond the periphery of the blade, each tooth-section also projecting laterally as a whole beyond the face of the blade and having countersunk holes in it with correspondingly-formed pieces constructed to enter said holes and thereby retain the sections in position, substantially as described.

In testimony whereof I have signed my name to this specification in the presence of two subscribing witnesses.

CHARLES C. NEWTON.

Witnesses:
   WILL. A. BARR,
   JAMES C. KRAYER.